United States Patent [19]
Lee

[11] Patent Number: 5,321,763
[45] Date of Patent: Jun. 14, 1994

[54] BODY SENSE SPEAKER

[76] Inventor: Jeong-Gi Lee, 4F1, 342-17, Kil 2-Dong, Kang Dong-Ku, Seoul, Rep. of Korea

[21] Appl. No.: 882,875

[22] Filed: May 14, 1992

Related U.S. Application Data

[63] Continuation-in-part of Ser. No. 653,501, Feb. 11, 1991, Pat. No. 5,125,033.

[30] Foreign Application Priority Data

Feb. 17, 1990 [KR] Rep. of Korea ............... 1742/1990

[51] Int. Cl.$^5$ ............................................. H04R 25/00
[52] U.S. Cl. ..................................... 381/199; 381/192; 381/200
[58] Field of Search ............... 381/199, 194, 151, 200, 381/192, 202, 201, 188, 197

[56] References Cited

U.S. PATENT DOCUMENTS

| | | | |
|---|---|---|---|
| 4,354,087 | 10/1982 | Osterlitz . | |
| 4,565,905 | 1/1986 | Nation | 381/193 |
| 4,843,628 | 6/1989 | Hofer | 381/200 |
| 4,967,871 | 11/1990 | Komatsubara . | |
| 5,125,033 | 6/1992 | Lee | 381/199 |

FOREIGN PATENT DOCUMENTS

| | | |
|---|---|---|
| 0372830 | 6/1990 | European Pat. Off. . |
| 2919884 | 11/1979 | Fed. Rep. of Germany . |
| 57-066501 | 4/1982 | Japan . |
| 2062342 | 5/1981 | United Kingdom . |

Primary Examiner—Curtis Kuntz
Assistant Examiner—Huyen D. Le
Attorney, Agent, or Firm—Robert E. Bushnell

[57] ABSTRACT

A body speaker comprising a casing having an upper part and a lower part; the upper part has a central circular aperture closed by a cap, a thin magnetic disk with a small diameter centrally attached on the inside of the cap, a tubular member fixed around the central circular aperture of the upper part, a solenoid coil wound around the tubular member. An oscillation body is disposed between the upper and lower parts for oscillating in response to variation of the magnetic field of the solenoid coil. Gaps are provided in an assembled configuration of the upper and lower parts, between the upper and lower surfaces of the oscillation body and the inside surfaces of the upper and lower parts of the casing when the oscillation body is fixed on the inside wall of the casing by means of an oscillation ring, so that the oscillation body may freely oscillate upwards and downwards in response to variation of the magnetic field of the solenoid coil conducting current.

30 Claims, 7 Drawing Sheets

BODY SENSE SPEAKER

CROSS-REFERENCE TO RELATED APPLICATIONS

This application is a continuation-in-part of, and makes reference to, and incorporates herein the teachings of, my co-pending application earlier filed in the U.S. Patent and Trademark Office on Feb. 11, 1991 and assigned Ser. No. 07/653,501, now U.S. Pat. No. 5,125,033 and claims the benefits available under 35 U.S.C. §120, which in turn, claims the benefit under 35 U.S.C. §119 of priority from my application filed in the Republic of Korea on Feb. 17, 1990 and there assigned Ser. No. 1990/1742.

TECHNICAL BACKGROUND

The present invention is related to a bodily sensed speakers, more particularly to musical sound reproducing systems and processes using a plurality of bodily sensed speakers.

Effective enjoyment of sound, such as, for example, music, usually requires a listener to sufficiently feel the rhythm, tone, and melody being played. Conventional musical sound reproducing systems and processes have tended to focus upon the ear in efforts to effectively impart a feeling of these characteristics.

The rhythm of sound, and especially of musical compositions, has a close connection with bodily movements such as dance. Hence, it may be considered that the rhythm is a factor of the music which may be felt not only through the ear, but also through the body of the listener.

SUMMARY OF THE INVENTION

It is therefore, an object of the present invention to provide improved sound reproducing systems and processes.

It is another object to provide a bodily sensed speaker (hereinafter referred to as "body speaker") in a musical sound reproducing system which enables a listener to feel the music not only through the ear, but also through the body.

It is still another object to provide music cushions equipped with a plurality of body speakers.

It is yet another object to provide music players' waistcoats equipped with a plurality of body speakers.

It is still yet another object to provide music players' belts equipped with a plurality of body speakers.

It is a further object to provide a mattress equipped with a plurality of body speakers.

These and other objects are achieved according to the principles of the present invention, with a body speaker comprising a casing having an upper part and a lower part. The upper part may be constructed with a central circular aperture closed by a cap, a thin magnetic disk having a small diameter centrally attached on the inside of the cap, a tubular member fixed around the central circular aperture of the upper part, a solenoid coil wound around the tubular member, and an oscillation body for oscillating in response to variation of the magnetic field of the solenoid coil. The oscillation body comprises a core constructed with a disk and a cylindrical projection formed centrally and integrally with the disk, a flat ring-shaped permanent magnet fixedly received around the cylindrical projection, a flat ring-shaped support ring concentrically fixed on the permanent magnet, and at least a resilient membranous oscillation ring fixed around the oscillation body. The outer edge portions of the oscillation ring being fixed along the inside wall of the casing, and the lower end portion of the tubular member bearing the solenoid coil are loosely inserted into a gap between the side wall of the cylindrical projection of the core, and the inside surfaces of the permanent magnet and support ring, wherein gaps are formed between the upper and lower surfaces of the oscillation body and the inside surfaces of the upper and lower part of the casing when the oscillation body is fixed on the inside wall of the casing by means of the oscillation ring, so that the oscillation body may freely oscillate upward and downward in response to variation of the magnetic field of the solenoid coil conducting current.

According to one aspect of the present invention, one end of the tubular member has a flange formed perpendicularly to the side surface of the tubular member, so that the flange may be supported by the peripheral portions of the central circular aperture of the upper part of the casing. Also it is preferable to provide the other end of the tubular member with a short flange so as to prevent the solenoid coil wound around the tubular member from escaping from the tubular member.

According to another aspect of the present invention, the casing may comprise an upper part, a lower part, and a frame for supporting the upper and lower parts.

According to still another aspect of the present invention, the cap closing the central aperture of the upper part is shaped concave like a cup with the bottom having a plurality of holes for passing the magnetic field lines of a small flat permanent magnet that is attached to the inside of the bottom and may be shaped like a disk, or ring, formed either with, or without, a plurality of holes. The upper end of the cup is provided with a flange resting upon the upper flange of the one end of the tubular member. The side and bottom portions of the cap fit into the tubular member.

According to yet another aspect of the present invention, there may be provided two resilient membranous oscillation rings, one of which is interposed between the disk portion of the core and the flat ring-shaped permanent magnet, and the other between the permanent magnet and the flat ring-shaped support ring.

According to a further aspect of the present invention, a resilient body such as rubber may be attached to the insides of the upper and lower parts of the casing so as to help the oscillation body oscillate more resiliently.

The present invention will now be described more specifically with reference to the drawings attached only by way of example.

BRIEF DESCRIPTION OF THE ATTACHED DRAWINGS

A more complete appreciation of this invention, and many of the attendent advantages thereof, will be readily apparent as the same becomes better understood by reference to the following detailed description when considered in conjunction with the accompanying drawings in which like reference symbols indicate the same or similar components, wherein.

DETAILED DESCRIPTION OF CERTAIN PREFERRED EMBODIMENTS

Figure 1:
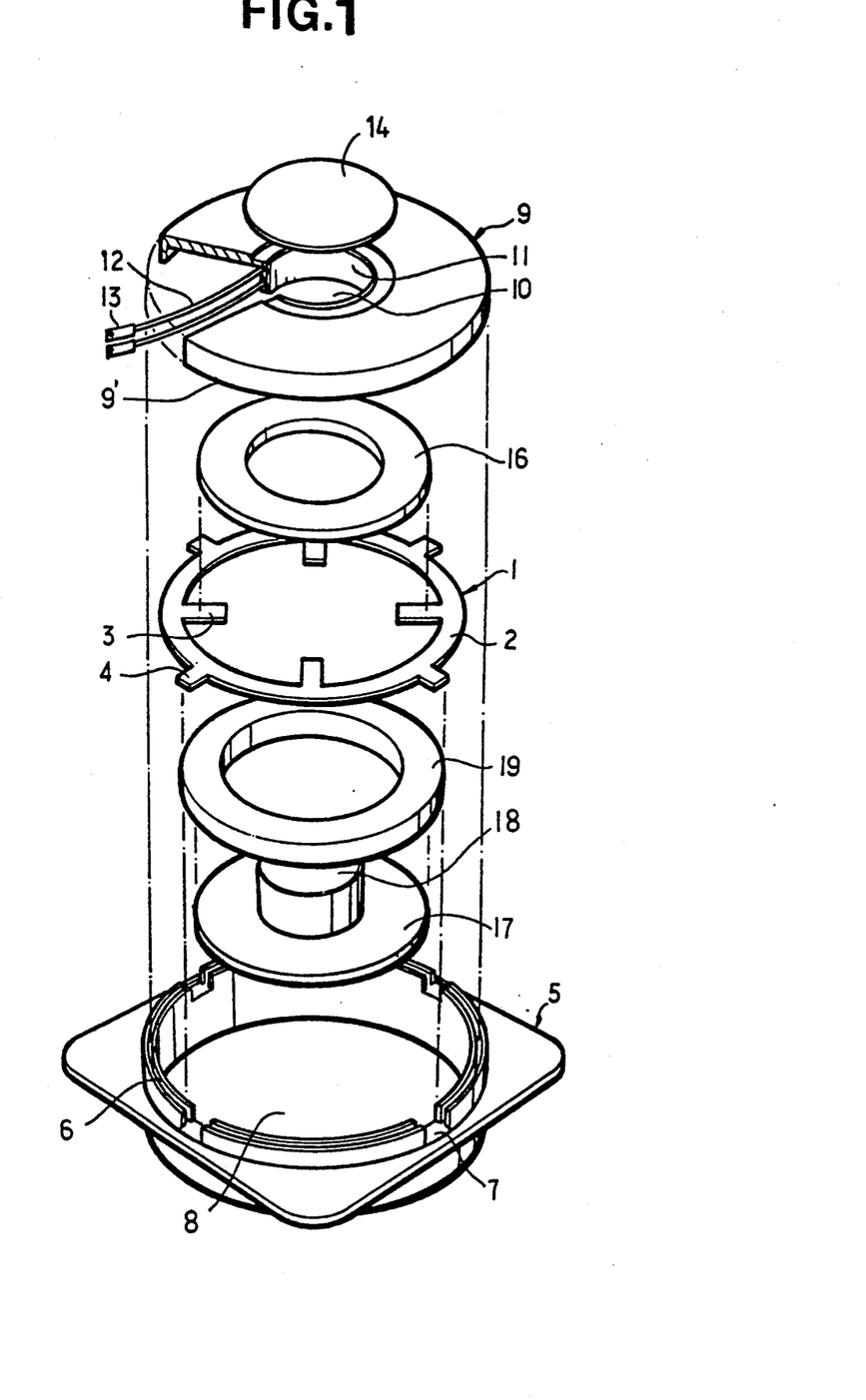
FIG. 1 is an exploded perspective view of a body speaker according one embodiment of the present invention.
Figure 2:
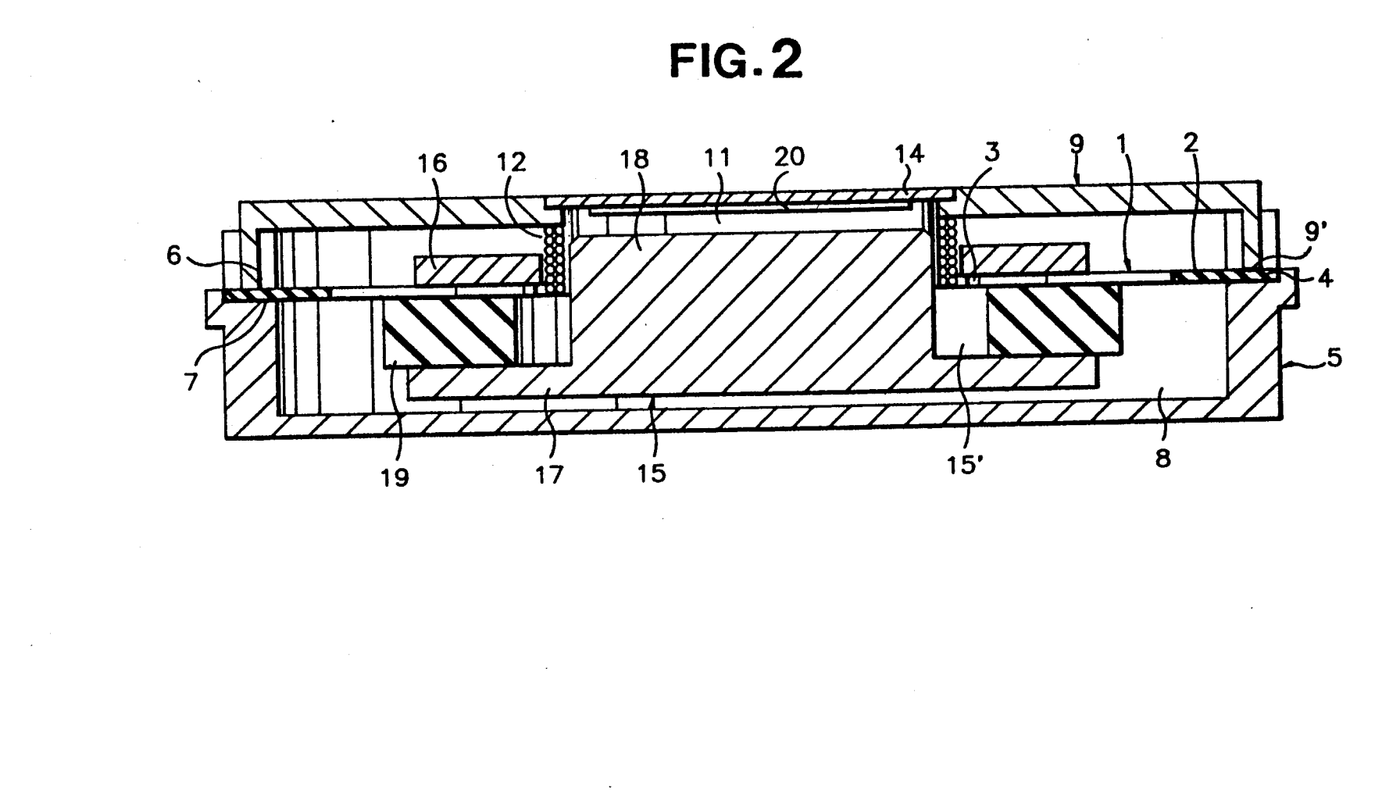
FIG. 2 is a cross sectional view of a body speaker of FIG. 1.

Referring now to the drawings, and in particular to FIGS. 1 and 2, an oscillation body is mounted inside a casing that comprises an upper part 9 with a central circular aperture 10, a cap 14 closing the aperture 10, and a lower part 5. A thin magnetic disk 20 with a small diameter is centrally attached on the inside of the cap 14. The oscillation body comprises a core consisting of a disk 17 and a cylindrical projection 18 formed centrally and integrally with the disk 17, a flat ring-shaped permanent magnet 19, a flat ring-shaped support ring 16 and a resilient membranous oscillation ring 2.

A tubular member 11 is fixed around the central circular aperture 10 of the upper part 9, and a solenoid coil 12 is wound around the tubular member 11.

The flat ring-shaped permanent magnet 19 is fixedly received around the cylindrical projection 18 with a proper gap between the side wall of the projection and the inside surface of the permanent magnet.

As shown in FIG. 2, the resilient membranous oscillation ring 2 is fixedly arranged between the permanent magnet 19 and the support ring 16. For example, the oscillation ring 2 has a plurality of inner and outer lugs 3, 4, which inner lugs 3 are interposed between the support ring 16 and permanent magnet 19 to fix the oscillation ring 2.

Thus, the support ring 16, oscillation ring 2, permanent magnet 19 and core 17, 18 are integrally fixed together so as not to allow any relative motions therebetween. Meanwhile, there is formed a suitable gap between the inside surface of the support ring 16 and the side wall of the cylindrical projection 18. The oscillation body thus obtained is suspended inside the casing by means of the outer lugs 4 interposed between the edge portions of the upper and lower part 9 and 5 as shown in FIG. 2.

Suitable synthetic resin and adhesive may be used for fixedly assembling the parts of the oscillation body. Means for fixing the oscillation ring to the inside wall of the casing may comprise a plurality of outer lugs 4 integrally formed with the oscillation ring, a plurality of grooves 7 formed on the upper end of the lower part to correspond with the lugs, and the lower end of the upper part for holding the lugs against the bottom of the grooves.

When the oscillation body is completely assembled, the tubular member 11 with the solenoid coil 12 requires to be freely moved between the inside surfaces of the support ring 16 and permanent magnet 19 and the side wall of the projection 18. Suitable gaps must be formed between the upper and lower surfaces of the oscillation body and the upper and lower inner surfaces of the casing.

Figure 3:
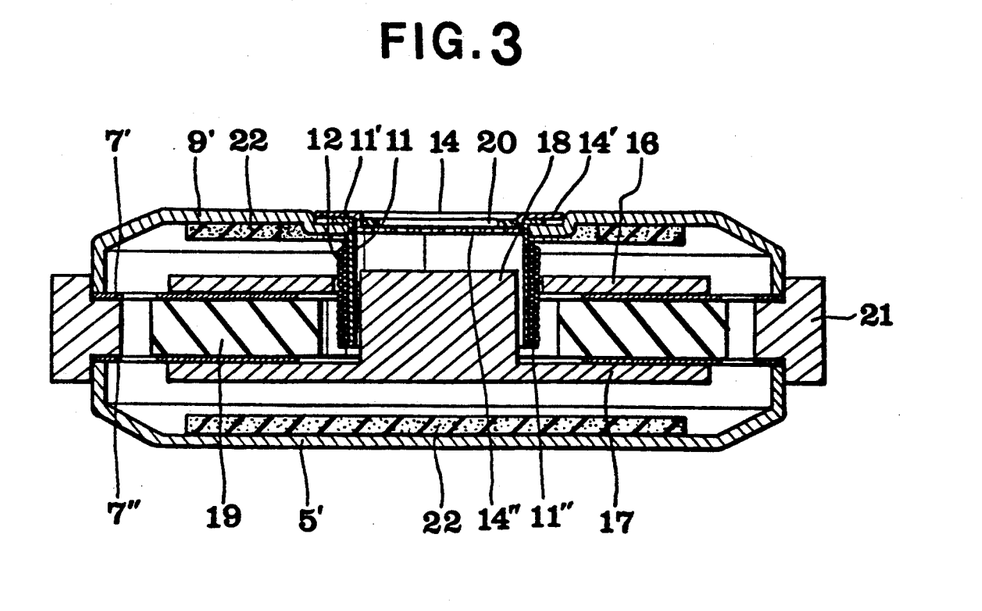
FIG. 3 is a view similar to FIG. 2 for illustrating another embodiment of the present invention.
Figure 4:
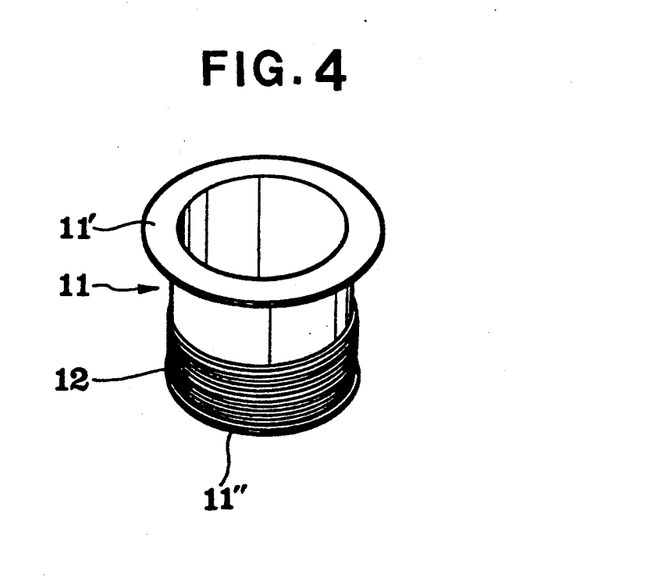
FIG. 4 is a perspective view of the tubular member shown in FIG. 3.
Figure 6:
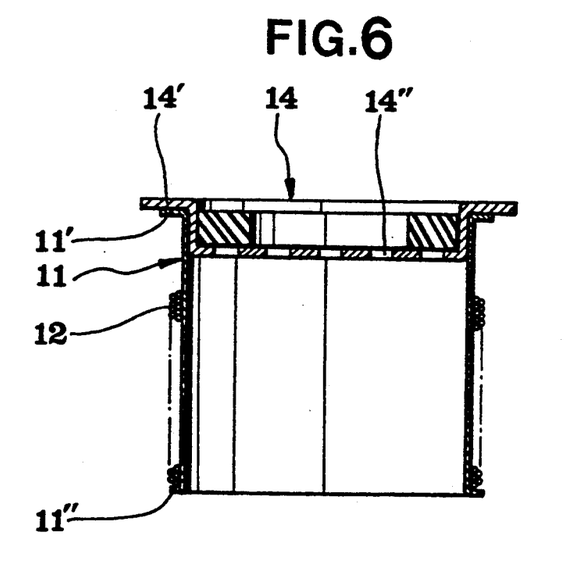
FIG. 6 is an enlarged cross sectional view of the tubular member into which the cap and small flat permanent magnet are inserted as shown in FIG. 3.

Preferably, one end of the tubular member 11, as shown in FIGS. 3, 4 and 6, has a flange 11' formed perpendicularly to the side surface of the tubular member, so that the flange 11' may be supported by the peripheral portions of the central circular aperture 10 of the upper part of the casing. Thus the tubular member 11 may be more firmly fixed to the upper part. Also it is more preferable to provide the other end of the tubular member (11) with a short flange (11") so as to prevent the solenoid coil (12) wound around the tubular member (11) from escaping therefrom.

Moreover, the casing may comprise an upper and lower parts 9' and 5' made of a light metal such as aluminum, and a plastic frame 21 for supporting the upper and lower parts. The plastic frame 21 is shaped as a short cylinder with a circular inner flange 21' formed along the half line of the inside. The flange 21' is to support the edge portions of the oscillation rings 7' and 7". In this case, one oscillation ring 7" is interposed between the disk portion of the core and the flat ring-shaped permanent magnet 19, and the other 7' between the permanent magnet 19 and the flat ring-shaped support ring 16, so that the oscillation body may be more firmly and resiliently hung by means of the two oscillation rings, whose peripheral portions are firmly fixed to the plastic frame 21. The peripheral portions of the two oscillation rings 7' and 7" are respectively interposed between the ring-shaped end surfaces of the upper and lower parts 9' and 5' of the casing and the upper and lower surfaces of the flange 21' of the frame 21.

Figure 7:
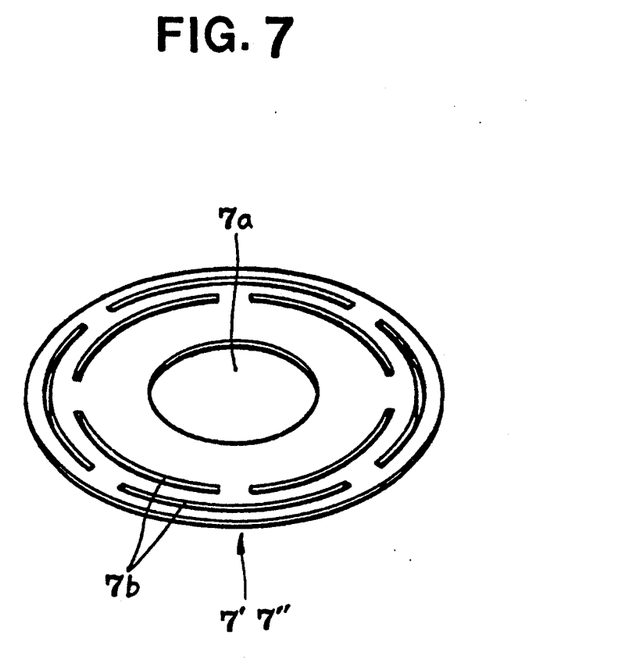
FIG. 7 is a perspective view of the resilient membranous oscillation rings as shown in FIG. 3.
Figure 8A:
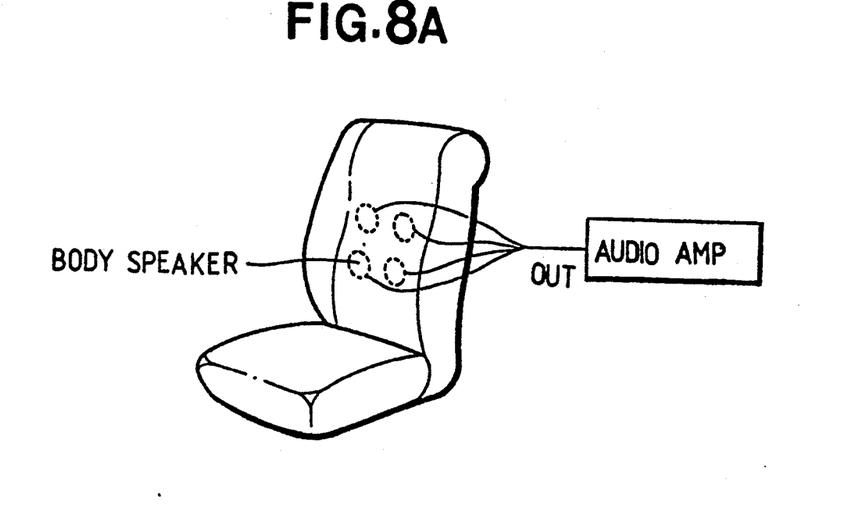
FIGS. 8A, 8B, 8C, 8D and 8E illustrate various embodiments of a musical sound reproducing system according to the present invention.
Figure 8B:
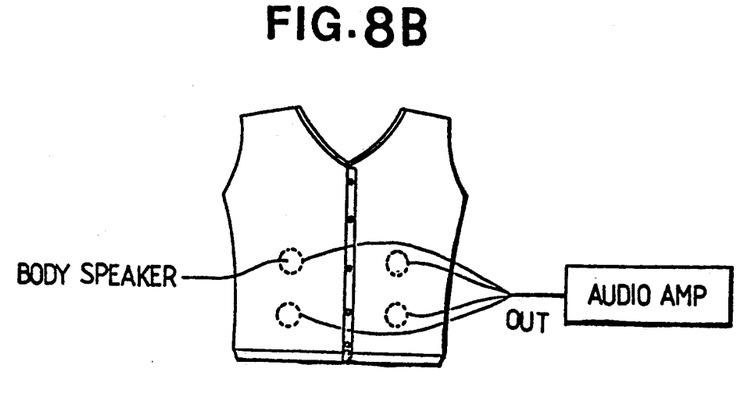
Figure 8C:
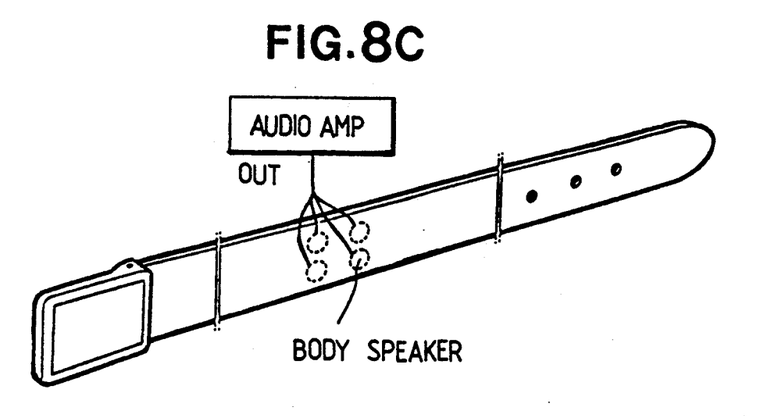
Figure 8D:
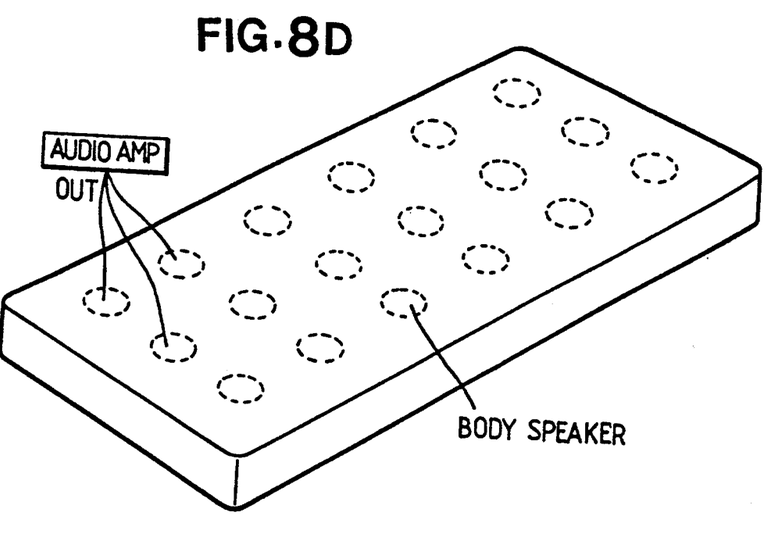
Figure 8E:
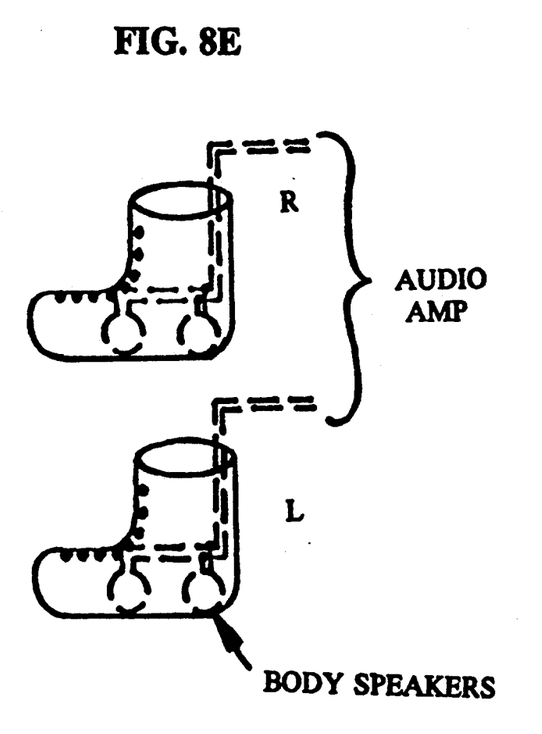

The resilient membranous oscillation rings 7', 7" shown in FIG. 3 has a central opening 7b for receiving the projection 18 of the core, and a plurality of arcuate slits for increasing the flexibility of the oscillation rings. The material used to make the oscillation rings may be a metal, nonferrous metal, synthetic resin, paper, or others to inherently maintain suitable resiliency.

Figure 5:
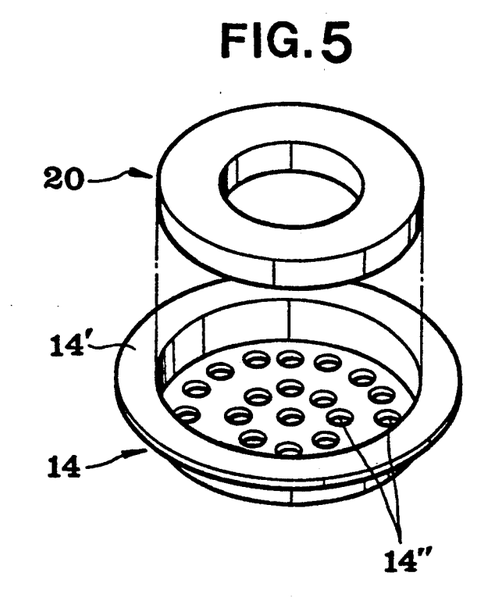
FIG. 5 is an exploded perspective view for illustrating the small flat permanent magnet being attached to the inside of the bottom of the cap as shown in FIG. 3.

As shown in FIGS. 5 and 6, the cap 14 closing the central aperture 10 of the upper part 9' is shaped concave like a cup with the bottom having a plurality of holes 14" for passing the magnetic field lines of a small flat permanent magnet 20 that is attached to the inside of the bottom and may be shaped like a disk or ring with or without a plurality of holes. The upper end of the cap is provided with a flange 14' rested on the upper flange 11' of the one end of the tubular member 11. The side and bottom portions of the cap 14 are inserted in the tubular member.

Preferably, a resilient body 22 such as rubber may be attached to the insides of the upper and lower parts 9' and 5' of the casing so as to help the oscillation body oscillate more resiliently.

There are shown in FIGS. 8A, 8B, 8C, 8D and 8E musical sound reproducing systems respectively comprising a cushion, waistcoat, belt, mattress and footwear equipped with the inventive body speakers, and an audio amplifier.

One of the methods for installing the body speakers in a cushion may be a process for integrally molding the cushion with the body speakers arranged in a pattern in a mold.

In operation of the body speakers, when the sound signals containing music (e.g., modulated audio frequency signals) generated by the audio amplifier is conducted into the solenoid coil of the oscillation body 16, 17, 18, 19, 2, 7', 7" in the casing, the oscillation body oscillates upwards and downwards. The oscillation is caused by the interaction between variation of the magnetic field of the solenoid 19. Consequently, the casing containing the oscillation body altogether oscillates according to variation of the intensity of the sound signals, so that the user of the cushion, waistcoat or belt containing the inventive body speakers vividly feels the rhythm of the music loaded on the sound signals through his body sensing the oscillation of the speakers.

Meanwhile, there exists always a mutual attraction between the thin magnetic disk 20 and the upper surface of the cylindrical projection 18 due to their magnetic fields, which helps the oscillation of the oscillation body 16, 17, 18, 19, 2, 7', 7'' when the solenoid coil conducts currents.

The body speakers disclosed more effectively oscillate in response to the sound signals loaded with music mostly containing medium or low tones. Hence, when listening to music reproduced by a stereo sound system comprising the inventive body speakers, only the medium and low tone signals of the music may be conducted into the body speakers so as to cause the body speakers to more effectively oscillate.

If the players of a jazz or popular music band composed of electric guitars, electronic organ, drum, etc. put on a waistcoat or belt equipped with the inventive body speakers, they may more effectively play music, fully absorbed therein, because they bodily sense the rhythm of the music that they tangibly feel through the body speakers.

Of course, it is preferable that the inventive body speakers are arranged to be in the part parts of a waistcoat or belt that are positioned in the back of the user.

Particularly, if the inventive body speakers are suitably arranged in a back cushion, or even in a seat cushion, of a seat of a vehicle, and connected with the audio amplifier of a stereo sound system of the vehicle, there is obtained a very effective musical sound reproducing system of the vehicle.

Naturally, the inventive body sense speakers may not only be used in all kinds of cushions or pads which are installed in the seats or beds arranged in a hotel, hospital, ship, airplane, theater, cafe, music hall, electronic game room, etc for sitting, reclining, or supporting the head of a person, but also suitably arranged in the floor of a dance hall in order to let the dancing persons bodily feel the rhythms of dance music transmitted through their soles.

Additionally, the body sense speakers may be installed in footwear.

It may be seen therefore, that the body speakers disclosed, and the systems and processes using these body speakers, more effectively convey to a listener a feeling responsive to sound signals, and especially, rythym of music, and particularly musical compositions containing predominantly medium or low tones.

What is claimed is:

1. A body speaker, comprising:
   a casing having an upper part and a lower part, said upper part having a central circular aperture;
   a tubular member fixed around the central circular aperture of said upper part;
   a solenoid coil wound around said tubular member, for providing a magnetic field by conducting an electrical current;
   a cap positioned to close said central circular aperture of said upper part, said cap comprising a first member having a concave shape with a bottom surface having a plurality of holes for enabling passage of lines of the magnetic field, a flange formed on an upper end of the cap and disposed to rest upon said tubular member, and an exterior circumferential surface portion being inserted into said tubular member;
   a magnetic disk centrally attached on the inside and on the bottom surface of said cap;
   oscillation means for oscillating in response to variation of the magnetic field of said solenoid coil, said oscillation means comprising a core comprised of a second disk and a cylindrical projection formed centrally and integrally with said second disk, a flat ring-shaped permanent magnet fixed around said cylindrical projection, a flat ring-shaped support ring concentrically fixed on said permanent magnet, and a resilient membranous oscillation ring disposed around said oscillation means;
   outer edge portions of said oscillation ring being fixed along an inside wall of said casing; and
   a lower end portion of said tubular member bearing said solenoid coil being loosely inserted into a gap between the side wall of said cylindrical projection of said core and inside surfaces of said permanent magnet and support ring;
   wherein other gaps are formed between upper and lower surfaces of said oscillation means and inside surfaces of the upper and lower part of said casing when said oscillation means is fixed on the inside wall of said casing by means of said oscillation ring, so that said oscillation means may freely oscillate upward and downward in response to variation of the magnetic field provided by said solenoid coil conducting the electrical current.

2. A body speaker as claimed in claim 1, wherein:
   one end of said tubular member has a flange formed perpendicularly to the side surface of said tubular member, so that said flange may be supported by peripheral portions of the central circular aperture of the upper part of the casing, and
   an opposite end of said tubular member has a short flange located to maintain the solenoid coil wound around the tubular member.

3. A body speaker as claimed in claim 2, wherein:
   said casing further comprises a frame disposed between said upper part and said lower part, and
   said oscillation means is further comprised of a plurality of said resilient membranous oscillation rings,
   a first one of said oscillation rings being interposed between said second disk and said flat ring-shaped permanent magnet, and
   a second one of said oscillation rings being interposed between said permanent magnet and said flat ring-shaped support ring,
   whereby said oscillation means is hung on said frame via said first one of said oscillation rings and said second one of said oscillation rings.

4. A body speaker as claimed in claim 2, further comprised of a plurality of bodies of resilient material attached to said inside surfaces of said upper and lower parts of the casing for helping said oscillation means oscillate more resiliently in response to said variation of the magnetic field.

5. A body speaker as claimed in claim 1, wherein said casing comprises:
   said upper part,
   said lower part, and a plastic frame supporting said upper and lower parts, said upper and lower parts being made of a metal.

6. A body speaker as claimed in claim 5, wherein said oscillation means is further comprised of:
- a plurality of said resilient membranous oscillation rings,
- a first one of said oscillation rings being interposed between said second disk and said flat ring-shaped permanent magnet, and
- a second one of said oscillation rings being interposed between said permanent magnet and said flat ring-shaped support ring,
- whereby said oscillation means is hung on said frame via said first one of said oscillation rings and said second one of said oscillation rings.

7. A body speaker as claimed in claim 1, wherein said tubular member and said solenoid coil move freely between the inside surfaces of the support ring and the permanent magnet and the side wall of the cylindrical projection of said oscillation means.

8. A body speaker as claimed in claim 7, wherein said magnetic disk is ring-shaped and perforated by a plurality of holes.

9. A body speaker as claimed in claim 1, wherein:
- said casing further comprises a frame disposed between said upper part and said lower part, and
- said oscillation means is further comprised of a plurality of said resilient membranous oscillation rings,
- a first one of said oscillation ring being interposed between said second disk and said flat ring-shaped permanent magnet, and
- a second one of said oscillation rings being interposed between said permanent magnet and said flat ring-shaped support ring,
- whereby said oscillation means is hung on said frame via said first one of said oscillation rings and said second one of said oscillation rings.

10. A body speaker as claimed in claim 1, further comprised of a plurality of bodies of resilient material attached to said inside surfaces of said upper and lower parts of the casing for helping said oscillation means more resiliently in response to said variation of the magnetic field.

11. A body speaker as claimed in claim 1, further comprised of a resin and adhesive attaching an inner edge of said oscillation ring to said support ring.

12. A body speaker as claimed in claim 1, wherein said oscillation ring comprises:
- a plurality of inner lugs integrally formed along the inner edge of said oscillation ring,
- said plurality of inner lugs connecting being interposed between said permanent magnet and said support ring.

13. A body speaker as claimed in claim 1, further comprised of:
- a synthetic resin laid on the outer edge of said oscillation ring,
- synthetic resin being interposed between the end surfaces of said upper and lower parts,
- whereby said oscillation ring is fixed to the inside wall of said casing by said synthetic resin.

14. A body speaker as claimed in claim 1, wherein:
- said oscillation ring comprises a plurality of outer lugs integrally formed with said oscillation ring,
- an upper end of said lower part of said casing contains a plurality of grooves corresponding to said plurality of outer lugs, and
- the lower end of said upper part holds said lugs against the bottom of said grooves.

15. A musical sound reproducing system of a room, comprising:
- an audio amplifier,
- a plurality of the body speakers as claimed in claim 1, and
- a cushion of a chair equipped with said plurality of body speakers, said body speakers being arranged in a pattern within said cushion, said plurality of body speakers being electrically connected to receive audio signals from said audio amplifier, whereby said plurality of body speakers rhythmically oscillate in response to variation of the magnetic field of the solenoid coil conducting said audio signals from said audio amplifier.

16. A dance hall, comprising:
- an audio amplifier,
- a plurality of the body speakers as claimed in claim 1, and
- a floor equipped with said plurality of body speakers, said body speakers being arranged in a pattern in said floor, said plurality of body speakers being electrically connected with said audio amplifier to receive from said audio amplifier audio signals representative of dance music played in the dance hall,
- whereby said plurality of body speakers rhythmically oscillate in response to variation of the magnetic field of the solenoid coil conducting said audio signals from said audio amplifier and thereby enable persons dancing upon said floor bodily feel the rhythms of said dance music transmitted through their soles.

17. A waistcoat, comprising:
- a plurality of the body speakers as claimed in claim 1, and
- a pad equipped with said plurality of body speakers, said body speakers being arranged in a pattern within said pad, said plurality of body speakers being connectable to receive audio signals from an audio amplifier,
- whereby said plurality of body speakers rhythmically oscillate within said pad in response to variation of the magnetic field of the solenoid coil conducting said audio signals received from said audio amplifier.

18. A belt, comprising:
- a plurality of the body speakers as claimed in claim 1, and
- a pad equipped with said plurality of body speakers, said body speakers being arranged in a pattern within said pad, said plurality of body speakers being connectable to receive audio signals from an audio amplifier,
- whereby said plurality of body speakers rhythmically oscillate within said pad in response to variation of the magnetic field of the solenoid coil conducting said audio signals received from said audio amplifier.

19. A mattress, comprising:
- a plurality of the body speakers as claimed in claim 1, and
- a pad equipped with said plurality of body speakers, said body speakers being arranged in a pattern within said pad, said body speakers being connectable to receive audio signals from an audio amplifier, whereby said body speakers rhythmically oscillate in response to variation of the magnetic field of the solenoid coil conducting said audio signals from said audio amplifier.

20. A cushion or pillow, comprising:
a plurality of the body speakers as claimed in claim 1, and
a pad equipped with said plurality of body speakers, said body speakers being arranged in a pattern within said pad, said body speakers being connectable to receive audio signals from an audio amplifier,
whereby said body speakers rhythmically oscillate in response to variation of the magnetic field of the solenoid coil conducting said audio signals from said audio amplifier.

21. Footwear comprising:
a plurality of the body speakers as claimed in claim 1, and
a pad equipped with said plurality of body speakers, said body speakers being arranged in a pattern within said pad, said body speakers being connectable to receive audio signals from an audio amplifier,
whereby said body speakers rhythmically oscillate in response to variation of the magnetic field of the solenoid coil conducting said audio signals from said audio amplifier.

22. A bodily sensing musical sound system, comprising:
a stereo sound system,
means for providing medium and low frequency signals from the output of said stereo sound system,
an amplifier for providing amplified signals by amplifying the medium and low frequency signals, and
a cushion equipped with a plurality of the body speakers as claimed in claim 1, coupled to receive the amplified signals from said amplifier, said body speakers being arranged spaced-apart within a pattern in said cushion.

23. A body sound speaker as claimed in claim 1, wherein said magnetic disk is ring-shaped and perforated by a plurality of holes.

24. A body speaker, comprising:
a casing having an upper part, a lower part and a frame disposed between said upper part and said lower part, said upper part having a central circular aperture;
a tubular member fixed around the central circular aperture of said upper part;
a solenoid coil wound around said tubular member, for providing a magnetic field by conducting an electrical current;
a cap positioned to close said central circular aperture of said upper part, said cap having a bottom surface perforated by a plurality of holes for enabling passage of lines of magnetic field, a flange formed on an upper end of the cap and disposed to rest upon said tubular member, and an exterior circumferential surface portion being inserted into said tubular member;
a first disk centrally attached on the inside and on the bottom surface of said cap;
oscillation means attached to said frame of said casing, for oscillating in response to variation of the magnetic field of said solenoid coil, said oscillation means comprising a core comprised of a second disk and a cylindrical projection formed centrally and integrally with said second disk, a flat ring-shaped permanent magnet fixed around said cylindrical projection, a flat ring-shaped support ring concentrically fixed on said flat ring-shaped permanent magnet, and a resilient membranous oscillation ring disposed around said oscillation means, said resilient membranous oscillation ring having outer edge portions being attached to said frame of said casing to enable said oscillation means to oscillate upward and downward in response to variation of the magnetic field provided by said solenoid coil conducting the electrical current; and
a lower end portion of said tubular member bearing said solenoid coil being loosely inserted into a gap between the side wall of said cylindrical projection of said core and inside surfaces of said flat ring-shaped permanent magnet and flat ring-shaped support ring.

25. The body speaker as claimed in claim 24, wherein said tubular member has a flange formed at one end perpendicular to a side surface of said tubular member, and said solenoid coil is wounded around said flange to provide said magnetic field.

26. The body speaker as claimed in claim 24, wherein said oscillation ring comprises a plurality of inner lugs integrally formed along the inner edge of said oscillation ring, said plurality of inner lugs being interposed between said flat ring-shaped permanent magnet and said flat ring-shaped support ring.

27. The body speaker as claimed in claim 24, wherein said first disk is a magnetic disk having a ring-shaped and is perforated by a plurality of holes.

28. A body speaker, comprising:
a housing having an upper part, a lower part and a frame disposed between said upper part and said lower part, said upper part having a central circular aperture;
a tubular member fixed around the central circular aperture of said upper part;
a solenoid coil wound around said tubular member, for providing a magnetic field by conducting an electrical current;
a cap positioned to close said central circular aperture of said upper part, said cap having with a bottom surface perforated by a plurality of holes for enabling passage of lines of magnetic field, a flange formed on an upper end of the cap and disposed to rest upon said tubular member, and an exterior circumferential surface portion being inserted into said tubular member;
oscillation means attached to said frame of said housing, for oscillating in response to variation of the magnetic field of said solenoid coil, said oscillation means comprising:
a core comprised of a disk and a cylindrical projection formed centrally and integrally with said disk;
a flat ring-shaped permanent magnet fixed around said cylindrical projection;
a flat ring-shaped support ring concentrically fixed on said flat ring-shaped permanent magnet;
a first resilient membranous oscillation ring disposed between said disk and said flat ring-shaped permanent magnet; and
a second resilient membranous oscillation ring disposed between said flat ring-shaped permanent magnet and said flat ring-shaped support ring, said first and second resilient membranous oscillation rings having outer edge portions being attached to said frame of said housing to enable said oscillation means to oscillate in response to variation of the magnetic field provided by said solenoid coil conducting the electrical current;

a lower end portion of said tubular member bearing said solenoid coil being loosely inserted into a gap between the side wall of said cylindrical projection of said core and inside surfaces of said flat ring-shaped permanent magnet and flat ring-shaped support ring.

29. The body speaker as claimed in claim 28, wherein said tubular member comprises a first portion having a first diameter positioned around the central circular aperture of the upper part of said housing, and a second portion continuously extending from said first portion and having a second diameter greater than said first diameter fixed around said cylindrical projection of said core, and said solenoid coil being wounded around said second portion surrounding said cylindrical projection to provide said magnetic field.

30. The body speaker as claimed in claim 28, wherein said second resilient membranous oscillation ring comprises a plurality of inner lugs integrally formed along the inner edge, said plurality of inner lugs being interposed between said flat ring-shaped permanent magnet and said flat ring-shaped support ring.

* * * * *